: 3,032,454
MEANS FOR MOLDING HEAT SEALS
Howard A. Rohdin, 397 Forest Ave., Glen Ridge, N.J.
Filed Jan. 2, 1957, Ser. No. 632,046
1 Claim. (Cl. 156—581)

It is an object of this invention to provide a method and apparatus for the heat sealing of opposed thick walls of plastic sheet or film without the formation of fins at the opposite margins of the heat seal.

Figure 1:
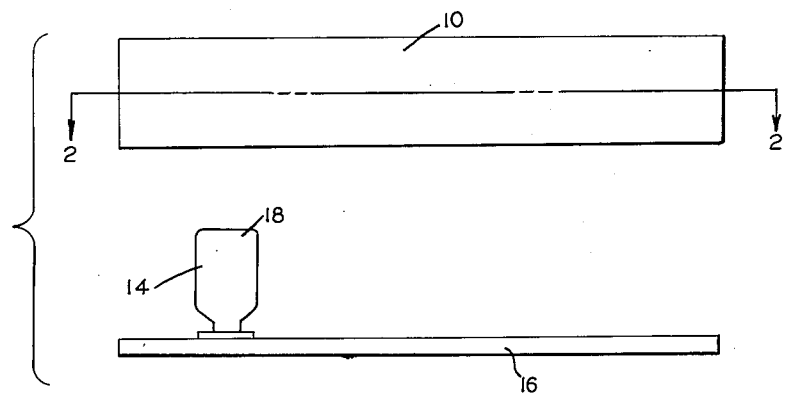
Figure 2:
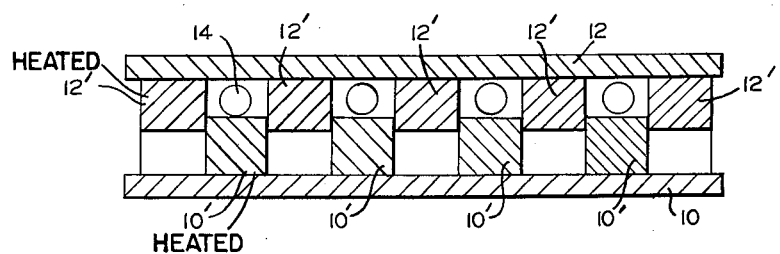
Figure 3:
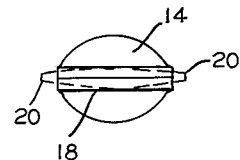

The above and other objects will be made clear from the following, detailed description taken in connection with the annexed drawings in which:

FIGURE 1 is an elevation of the improved apparatus;
FIGURE 2 is a section taken on the line 2—2 of FIGURE 1 and,
FIGURE 3 is a plan view of a completed seal.

This invention will be described with particular reference to thick walled plastic tubes, but is applicable wherever it is desired, in making a heat seal, to avoid the formation of laterally projecting fins at opposite ends of the seal and where it is desirable to avoid thinning and thereby weakening the material in the area of the seal.

The use of plastic collapsible tubes is constantly increasing. These tubes are molded, printed and capped and are filled from what is conventionally the "bottom," after which the bottom is closed by collapsing its walls into a single plane and then by the application of heat and pressure, an integral seal is effected.

In the nature of things, collapsible tubes of this type are subjected to quite substantial internal hydrostatic pressure, for which reason the tubes have a wall thickness considerably greater than that of films normally used in packaging operations. When these thick walled tubes are closed between conventional heat sealing jaws, the temperatures involved are higher than in ordinary heat sealing practice, this being necessary to maintain a satisfactory units per minute production rate. With the thick walls and higher temperatures, plastic tends to flow laterally, producing alternated, laterally projecting fins at opposite ends of the seal, with a general reduction in the strength of the seal.

The present invention contemplates a lateral confinement of the seal during the application of heat and pressure, thereby eliminating the above mentioned fin formation and preserving the thickness and strength of the seal.

In FIGURE 1 appears one jaw 10 of a pair of jaws 10 and 12 (FIGURE 2). Each of the jaws 10 and 12 has respectively a series of projections 10' and 12', these being sized and spaced to intermesh. The jaws are moved toward and from each other by conventional means not shown. The heating is accomplished preferably by the means disclosed in my co-pending application Serial No. 473,866, filed December 8, 1954, now Patent 2,908,320, dated October 13, 1959, though for the purpose of this invention the precise manner of heating is immaterial. Also in practice, the plastic contacting surfaces usually will be covered with a Teflon impregnated glass fabric. This again is conventional practice which it is not deemed necessary here to illustrate.

A row of capped and filled tubes 14 come in batches from a conventional filling machine and are delivered to a platform 16 underlying the jaws 10 and 12. As will be best observed in FIGURE 2, each tube 14 underlies a space defined by the jaw 12, two of its projections 12' and a projection 10' on the jaw 10. By conventional means not shown, the jaws 10 and 12 and the platform 16 carrying the tubes 14 are caused to approach each other so that the cylindrical ends 18 enter into the interdigital spaces above described. The jaws 10 and 12 then approach each other, compressing the tube ends 18 to the condition illustrated in FIGURE 3. The projections 12' afford lateral restraint, so that what ordinarily is a sealing operation becomes not only that but actually a molding operation whereby the seal thickness and its strength are maintained without the formation at opposite ends of the seam, of alternated fins 20 indicated in dotted outline in FIGURE 3.

In practice, all collapsible tubes are individually cartoned and the carton size is determined by the maximum lateral dimension of the tube. Restriction of this dimension therefore contributes to a reduction of overall packaging cost as well as enhancing the strength and appearance of the tube.

While certain specific embodiments have been described herein, the invention is susceptible of many specific variations and is to be limited only as set forth in the subjoined claim.

I claim:
Apparatus for forming transverse heat seals between opposed plastic walls comprising: a pair of jaws movable toward and from each other; means for heating at least one of said jaws; at least two projections on one of said jaws, said projections having opposed walls parallel to each other with a rear wall normal to said opposed walls to define a rectilinear, U-shaped channel; at least one projection on the other of said jaws, sized, proportioned and located snugly to fit and enter said channel and to define therewith a rectilinear molding chamber closed in two dimensions and open in the third.

References Cited in the file of this patent
UNITED STATES PATENTS

| | | |
|---|---|---|
| 2,024,578 | Haase | Dec. 17, 1935 |
| 2,239,133 | Waters | Apr. 22, 1941 |
| 2,455,215 | Beckwith | Nov. 30, 1948 |
| 2,479,375 | Langer | Aug. 16, 1949 |
| 2,491,226 | Jacques et al. | Dec. 13, 1949 |
| 2,496,609 | Antwerpen | Feb. 7, 1950 |
| 2,557,975 | King | Jan. 26, 1951 |
| 2,638,964 | Andina | May 19, 1953 |
| 2,653,646 | Swartz | Sept. 29, 1953 |
| 2,653,647 | Swartz | Sept. 29, 1953 |
| 2,715,087 | Barradas | Aug. 9, 1955 |
| 2,724,424 | Clayton | Nov. 22, 1955 |